US012269711B2

(12) United States Patent
Fujiwara et al.

(10) Patent No.: US 12,269,711 B2
(45) Date of Patent: Apr. 8, 2025

(54) IN-BUILDING TRAFFIC PREDICTION SYSTEM AND ELEVATOR BOARDING PLACE LAYOUT GENERATION METHOD AND NON-TRANSITORY COMPUTER-READABLE RECORDING MEDIUM FOR STORING PROGRAM FOR IN-BUILDING TRAFFIC PREDICTION SYSTEM

(71) Applicant: Hitachi, Ltd., Tokyo (JP)

(72) Inventors: Masayasu Fujiwara, Tokyo (JP); Takamichi Hoshino, Tokyo (JP); Satoru Toriyabe, Tokyo (JP); Takahiro Hatori, Tokyo (JP); Wataru Toriumi, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 1380 days.

(21) Appl. No.: 16/760,176

(22) PCT Filed: Oct. 11, 2018

(86) PCT No.: PCT/JP2018/038003
§ 371 (c)(1),
(2) Date: Apr. 29, 2020

(87) PCT Pub. No.: WO2019/087730
PCT Pub. Date: May 9, 2019

(65) Prior Publication Data

US 2020/0262680 A1 Aug. 20, 2020

(30) Foreign Application Priority Data

Oct. 30, 2017 (JP) ................................ 2017-209291

(51) Int. Cl.

| | |
|---|---|
| ***B66B 3/00*** | (2006.01) |
| ***B66B 1/24*** | (2006.01) |
| ***B66B 5/00*** | (2006.01) |

(52) U.S. Cl.
CPC ................ *B66B 3/006* (2013.01); *B66B 1/24* (2013.01); *B66B 5/0025* (2013.01); *B66B 5/0031* (2013.01)

(58) Field of Classification Search
CPC ......... B66B 3/006; B66B 1/24; B66B 5/0025; B66B 5/0031; B66B 19/00
See application file for complete search history.

(56) References Cited

U.S. PATENT DOCUMENTS

| | | | | |
|---|---|---|---|---|
| 2009/0159374 A1* | 6/2009 | Sorsa | B66B 1/2458 | 187/383 |
| 2010/0174509 A1* | 7/2010 | Raghunathan | G06F 30/13 | 703/2 |

(Continued)

FOREIGN PATENT DOCUMENTS

| | | |
|---|---|---|
| CN | 101613043 A | 12/2009 |
| JP | 55-56963 A | 4/1980 |

(Continued)

OTHER PUBLICATIONS

International Search Report (PCT/ISA/210) issued in PCT Application No. PCT/JP2018/038003 dated Dec. 25, 2018 with English translation (three (3) pages).

(Continued)

*Primary Examiner* — Jeffrey Donels
(74) *Attorney, Agent, or Firm* — Crowell & Moring LLP

(57) ABSTRACT

By using, as input, elevator specification information including at least sizes, quantity, and service floors of a plurality of elevators, a method for installing the plurality of elevators is calculated based on either the quantity of the plurality of elevators or the sizes of the plurality of elevators from arrangements including at least one or more of a planar arrangement where the plurality of elevators are aligned in a row on one side configuring an elevator boarding place, or an opposed arrangement where the elevators are divided and located on two opposite sides configuring the elevator boarding place; the shape of the elevator boarding place is determined by calculating the two sides configuring the (Continued)

elevator boarding place on the basis of the installation method and the sizes and quantity of the plurality of elevators; and furthermore, an elevator boarding place layout is generated by determining each floor where the elevator boarding place is to be installed according to the service floors.

6 Claims, 12 Drawing Sheets

(56) References Cited

U.S. PATENT DOCUMENTS

| | | | | |
|---|---|---|---|---|
| 2018/0305174 | A1* | 10/2018 | Muncy | B66B 3/006 |
| 2018/0327214 | A1* | 11/2018 | Armistead | G01C 21/206 |

FOREIGN PATENT DOCUMENTS

| | | | |
|---|---|---|---|
| JP | 58-152769 | A | 9/1983 |
| JP | 2006-268264 | A | 10/2006 |
| JP | 2007-72682 | A | 3/2007 |
| JP | 2009-96612 | A | 5/2009 |
| JP | 2014-174619 | A | 9/2014 |

OTHER PUBLICATIONS

Japanese-language Written Opinion (PCT/ISA/237) issued in PCT Application No. PCT/JP2018/038003 dated Dec. 25, 2018 (three (3) pages).

Hindi-language Office Action issued in Indian Application No. 202017018380 dated Apr. 29, 2021 with English translation (7 pages).

* cited by examiner

FIG. 2

500

| | CAGE | CAGE #1 (506) | CAGE #2 (507) | CAGE #3 (508) | CAGE #4 (509) |
|---|---|---|---|---|---|
| 501 | SIZE[m] | 2.15 | 2.15 | 2.15 | 2.15 |
| 502 | CAPACITY (PERSONS) | 15 | 15 | 15 | 15 |
| 503 | RATED SPEED (m/s) | 180 | 180 | 180 | 180 |
| 504 | ACCELERATION ($m/s^2$) | 0.8 | 0.8 | 0.8 | 0.8 |
| 505 | DOOR OPEN/ CLOSE TIME (s) | 3.5 | 3.5 | 3.5 | 3.5 |

FIG. 3

600

| | 607 | 608 | 609 | 610 | 611 | 612 |
|---|---|---|---|---|---|---|
| | FLOOR | FLOOR HEIGHT(m) | SERVICE FLOORS | | | |
| | | | CAGE #1 | CAGE #2 | CAGE #3 | CAGE #4 |
| 601 | 6 | | | | ○ | ○ |
| 602 | 5 | 4 | | | ○ | ○ |
| 603 | 4 | 4 | ○ | ○ | | |
| 604 | 3 | 4 | ○ | ○ | | |
| 605 | 1 | 9 | ○ | ○ | ○ | ○ |
| 606 | B1 | 5 | ○ | ○ | ○ | ○ |

FIG. 4

| FLOOR | | BOARDING FLOOR | | | | | |
|---|---|---|---|---|---|---|---|
| | | B1 | 1 | 3 | 4 | 5 | 6 |
| DESTINATION FLOOR | 6 | 0 | 58 | 0 | 0 | 0 | — |
| | 5 | 0 | 22 | 0 | 0 | — | 0 |
| | 4 | 0 | 36 | 0 | — | 0 | 0 |
| | 3 | 0 | 41 | — | | 0 | 0 |
| | 1 | 0 | — | 0 | 3 | 2 | 1 |
| | B1 | — | 0 | 0 | 0 | 0 | 0 |

700 701 702 703 704 705 706 707 708 709 710 711 712

FIG. 5

120

| No. | QUANTITY OF ELEVATORS (121) | INSTALLATION METHOD (122) | HALL LENGTH(m) (123) | HALL WIDTH(m) (124) | PASSAGE WIDTH(m) (125) |
|---|---|---|---|---|---|
| 1 (126) | 4 | OPPOSED | 8 | 3.5 | 3 |
| 2 (127) | 3 | PLANAR | 7 | 3.3 | 2.8 |
| 3 | 6 | OPPOSED | 7.3 | 3.8 | 3.1 |
| 4 | 8 | OPPOSED | 8.2 | 4 | 3.2 |
| 5 | 7 | OPPOSED | 9 | 4.2 | 4.2 |
| 6 | : | : | : | : | : |

IN-BUILDING TRAFFIC PREDICTION SYSTEM AND ELEVATOR BOARDING PLACE LAYOUT GENERATION METHOD AND NON-TRANSITORY COMPUTER-READABLE RECORDING MEDIUM FOR STORING PROGRAM FOR IN-BUILDING TRAFFIC PREDICTION SYSTEM

TECHNICAL FIELD

The present invention relates to an in-building traffic prediction system and an elevator boarding place layout generation method and a non-transitory computer-readable recording medium for storing program for the in-building traffic prediction system; and particularly, the invention is suited for use in an in-building traffic prediction system regarding technology for generating layouts of elevator boarding places.

BACKGROUND ART

Regarding renewal planning for appropriate operations of elevators and improvements of user-friendliness, it is very important to recognize and predict the operation status and usage status of the elevators.

There is proposed, as first conventional technology, an apparatus for estimating in-building pedestrian movement data indicating from which floor to which floor pedestrians have moved, from the number of people getting on and off elevators on each floor (see PTL 1). There is provided, as second conventional technology, a method for estimating the number of people getting on and off the elevators on each floor from changes in loads detected at the elevators (see PTL 2). There is provided, as third conventional technology, a human flow calculation apparatus for simulating human transportation by the elevators in consideration of the layout of each floor in a building, elevator installation conditions, and so on (see PTL 3).

The changes in the loads on each floor, which are detected at least at the elevators are recorded as operation result data by combining these first to third conventional technologies; and the in-building pedestrian movement data indicating from which floor to which floor the pedestrians have actually moved in the building can be estimated by using the apparatus and method according to the first and second conventional technologies.

Furthermore, by using the human flow calculation apparatus disclosed as the third conventional technology, movements of the pedestrians in the building and the operations of the elevators can be predicted by inputting the above-described in-building pedestrian movement data and information such as layout data of the building and installed positions, service floors, capacities, and speeds of the elevators which are installed in the building.

CITATION LIST

Patent Literature

PTL 1: Japanese Patent Application Laid-Open (Kokai) Publication No. S58-152769

PTL 2: Japanese Patent Application Laid-Open (Kokai) Publication No. S55-056963

PTL 3: Japanese Patent Application Laid-Open (Kokai) Publication No. 2009-096612

SUMMARY OF THE INVENTION

Problems to be Solved by the Invention

However, with the human flow calculation apparatus according to the third conventional technology, it is required to create an elevator boarding place layout of each floor in the building by whatever means. In recent years, means for managing architectural drawings and facility data of buildings, such as CAD (Computer Aided Design) and BIM (Building Information Modeling), have been provided; however, regarding buildings which were built in the past, it is often impossible to acquire BIM and CAD data. Furthermore, there are various formats of the CAD and BIM data and it is often impossible to directly carry out simulations, which are indicated as the third conventional technology, unless the data are converted or information is added. Accordingly, when an attempt is to be made to carry out the detailed simulations in order to comprehend the usage status of elevators, movements of pedestrians, and congestion situation, it has been conventionally necessary to manually create the boarding place layouts of the elevators from the information such as the architectural drawings and photographs and there has been a problem of requiring manhours.

The present invention was devised in consideration of the above-described circumstances and aims at proposing an elevator boarding place layout generation method and a non-transitory computer-readable recording medium for storing program for an in-building traffic prediction system capable of automatically generating the boarding place layouts of the elevators, with no manual intervention, from elevator specification information including the quantity and sizes of the elevators and service floors.

Means to Solve the Problems

In order to solve the above-described problem, the present invention includes: an elevator boarding place layout generation unit that: by using, as input, elevator specification information including at least sizes, quantity, and service floors of a plurality of elevators, calculates a method for installing the plurality of elevators based on either the quantity of the plurality of elevators or the sizes of the plurality of elevators from arrangements including one or more of a planar arrangement where the plurality of elevators are aligned in a row on one side configuring a boarding place of the elevator, or an opposed arrangement where the plurality of elevators are divided and located on two opposite sides configuring the elevator boarding place; determines a shape of the elevator boarding place by calculating the two sides configuring the elevator boarding place on the basis of the installation method and the sizes and quantity of the plurality of elevators; and further generates an elevator boarding place layout by determining each floor where the elevator boarding place is to be installed according to the service floors; and a simulation unit that predicts operations of the plurality of elevators and movements of pedestrians in an entire building or at an arbitrary point on the basis of at least the elevator boarding place layout.

Furthermore, the present invention includes: an elevator boarding place layout generation step of causing an in-building traffic prediction system to: by using, as input, elevator specification information including at least sizes, quantity, and service floors of a plurality of elevators, calculate a method for installing the plurality of elevators based on either the quantity of the plurality of elevators or the sizes of the plurality of elevators from arrangements including at least one or more of a planar arrangement where the plurality of elevators are aligned in a row on one side configuring a boarding place of the elevator, or an opposed arrangement where the elevators are divided and located on two opposite sides configuring the elevator boarding place; determine a shape of the elevator boarding place by calculating the two sides configuring the elevator boarding place on the basis of the installation method and the sizes and quantity of the plurality of elevators; and further generate an elevator boarding place layout by determining each floor where the elevator boarding place is to be installed according to the service floors; and a simulation step of causing the in-building traffic prediction system to predict operations of the plurality of elevators and movements of pedestrians in an entire building or at an arbitrary point on the basis of at least the elevator boarding place layout.

Advantageous Effects of the Invention

According to the present invention, the elevator boarding place layouts can be generated automatically with no manual intervention from the elevator specification information including the quantity and sizes of elevators and service floors.

BRIEF DESCRIPTION OF DRAWINGS

FIG. 2 is a diagram illustrating elevator capacity, a rated speed, acceleration, and door open/close time of each cage as an example of elevator specifications;

FIG. 3 is a diagram illustrating service floors and floor heights of the service floors as an example of elevator specification information;

FIG. 4 is a diagram illustrating an example of in-building pedestrian movement data;

FIG. 5 is a diagram illustrating an example of a parameter database as a table;

DESCRIPTION OF EMBODIMENTS

An embodiment of the present invention will be described below in detail with reference to the drawings.

Figure 1:
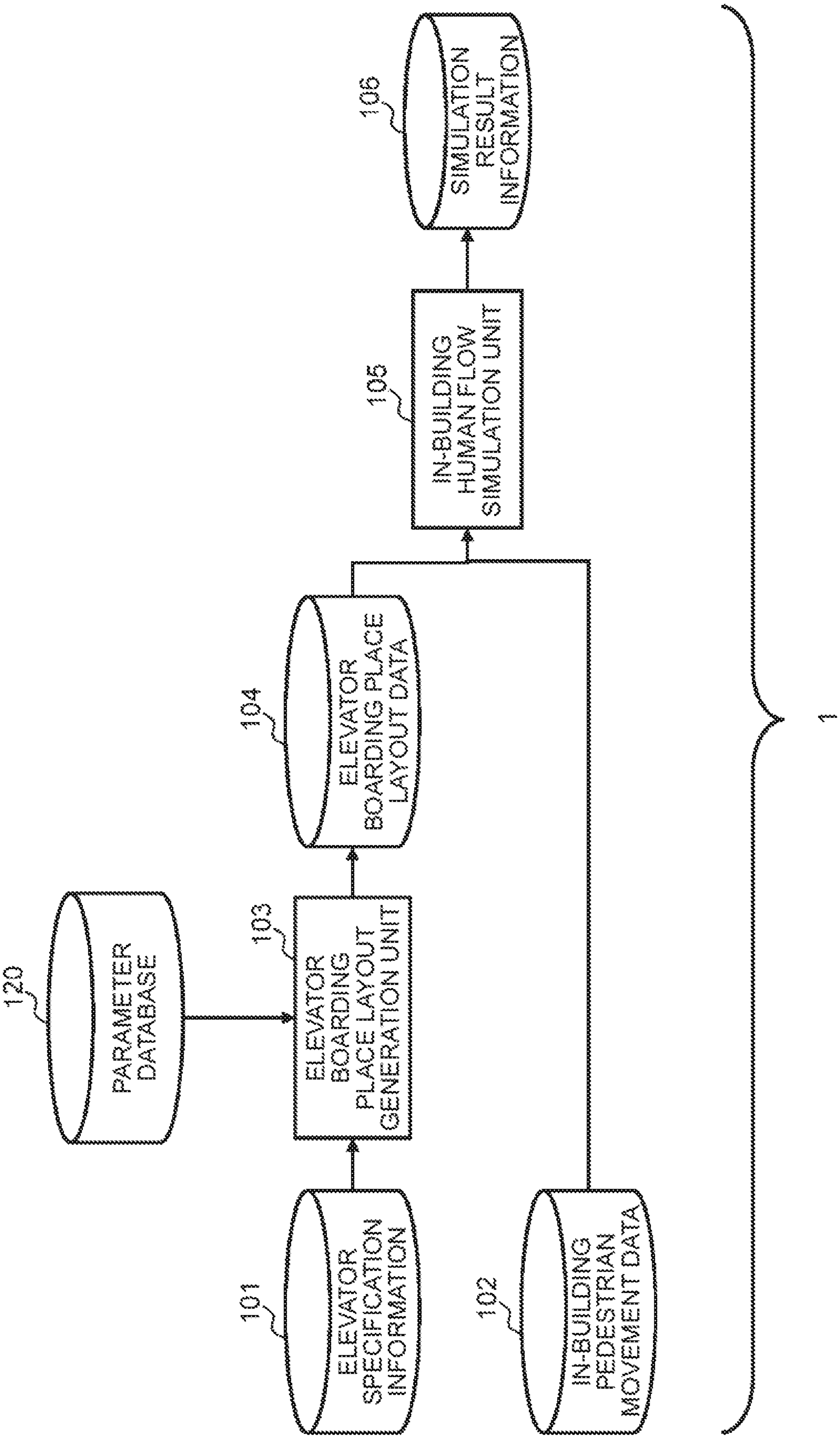
FIG. 1 is a block diagram illustrating a schematic configuration of an in-building traffic prediction system according to this embodiment.

(1) Outline of in-Building Traffic Prediction System According to this Embodiment (1-1) System Configuration FIG. 1 illustrates an example of a schematic configuration of an in-building traffic prediction system 1 according to this embodiment. The in-building traffic prediction system 1 is composed of, for example, a computer and includes elevator specification information 101, in-building pedestrian movement data 102, an elevator boarding place layout generation unit 103, an elevator boarding place layout data 104, an in-building human flow simulation unit 105, and simulation result information 106.

The elevator specification information 101 includes at least the quantity of elevators, the size of each elevator, service floors, and floor heights and may include information about the capacity of each elevator. Incidentally, the size of the elevator may be calculated from its capacity. This elevator specification information 101 merely includes information about the quantity, sizes, and service floors of the elevators and the floor heights and the layout of an elevator boarding place cannot be generated directly from such information. The in-building pedestrian movement data 102 is data about pedestrians who move within a building where the elevators are installed.

The elevator boarding place layout generation unit 103 calculates parameters for the elevator boarding place layout according to the elevator specification information 101, which has been input, by a predetermined method and outputs the elevator boarding place layout data 104. Incidentally, this elevator boarding place layout generation unit 103 is composed of, for example, a program (hereinafter also referred to as an “elevator boarding place layout program”). This program may be, for example, in a form stored in a computer-readable non-transitory storage medium and may be installable in the above-mentioned computer.

The in-building human flow simulation unit 105: carries out a simulation with respect to movements of pedestrians who move within the building, and the operations of the elevators by using, as inputs, the elevator boarding place layout data 104 and the in-building pedestrian movement data 102 which are output as described above; and outputs the simulation result information 106 indicating the process or result of the simulation. This simulation result information 106 includes any one of the elevator operations, the movements of the pedestrians, and congestion of the pedestrians at an arbitrary point.

The elevator boarding place layout generation unit 103 may perform the calculation by using a parameter database 120, in which actual results and standard values of various parameters for the elevator boarding place according to the elevator specification information 101 are managed, as a method for calculating the parameters for the elevator boarding place layout according to the elevator specification information 101. Incidentally, regarding the simulation of the pedestrians who move within the building, for example, the aforementioned human flow calculation apparatus may be used.

(1-2) Table Structure

FIG. 2 illustrates an example of an elevator specification table 500 indicated in FIG. 1. The elevator specification table 500 is a table for managing the elevator specification information 101. The elevator specification table 500 shows, as part of elevator specifications, the size in a row 501, the capacity in a row 502, a rated speed in a row 503, acceleration in a row 504, and door open/close time in a row 505, respectively, and values are indicated for the respective cages in columns 506 to 509.

The size refers to at least the width in a planar horizontal direction where a door is installed. Since there is often a correlation between the size and the capacity, either one of them may be input and the other value may be calculated by using a regression formula or may be calculated by using a correspondence relation table which is input in advance. The door open/close time may be stored as a plurality of values which can be calculated, by dividing them according to, for example, door widths and door speeds.

FIG. 3 illustrates an example of an elevator specification table 600 indicated in FIG. 1. The elevator specification table 600 manages the elevator specification information 101. The elevator specification table 600: includes, as its column items, a floor name 607, a floor height 608, and service floors 609 to 612 which indicate floors where the respective cages stop; and manages row data 601 to 606 for each floor, which are composed of the above-described column items. Regarding these service floors 609 to 612, values of each floor are managed.

Under this circumstance, the service floor indicates a floor which is set so that the elevator of each cage can stop. The floor height indicates the size from an upper end of a floor structure material of each floor to an upper end of the floor structure material of a floor immediately above the relevant floor. The service floors 609 to 612 indicate that the elevator of the relevant cage stops only on the floor with the mark "o". Specifically speaking, cage #1 and cage #2 stop on the B1st floor to the 4th floor, while they do not stop on the 5th floor and the 6th floor; and cage #3 and cage #4 stop on the B1st floor, the 1st floor, the 5th floor, and the 6th floor, while they do not stop on the 3rd floor and the 4th floor FIG. 4 illustrates an example of an in-building pedestrian movement data table 700 indicated in FIG. 1. This in-building pedestrian movement data table 700 manages the aforementioned in-building pedestrian movement data 102.

The in-building pedestrian movement data table 700: includes, as its column items, boarding floors 707 to 712 with respect to the respective floors; and manages combinations of these boarding floors 707 to 712 with respect to the respective floors and destination floors 701 to 706 which are row data.

A value of a combination of the boarding floor 707 to 712 and the destination floor 701 to 706 represents how many passengers (pedestrians) moved from which boarding floor to which destination floor. For example, the number of passengers (pedestrians) who got into the elevator on the 1st floor and got off on the 3rd floor is 41 persons, that is, the number of persons indicated in a field where the boarding floor 708 intersects with the destination floor 703 (corresponding to the value of the above-mentioned combination).

Regarding the in-building pedestrian movement data table 700, the in-building pedestrian movement data 102 may be managed by dividing them by each arbitrary time interval. For example, the in-building pedestrian movement data 102 from 8:30 to 9:00 may be divided into six 5-minute time intervals of 8:30 to 8:35, 8:35 to 8:40, 8:40 to 8:45, 8:45 to 8:50, 8:50 to 8:55, and 8:55 to 9:00 to manage the number of moving persons in each time interval, so that the status of movements of pedestrians within the building can be recognized in more detail.

FIG. 5 illustrates an example of a parameter database 120 indicated in FIG. 1. The parameter database 120: includes, as its column items for each reference number, the quantity of elevators 121, an installation method 122, a hall length 123, a hall width 124, and a passage width 125; and manages row data 126, 127 which are composed of the above-described column items. Specifically speaking, the parameter database 120 manages some or all of the parameters which configure each elevator boarding place layout, with respect to each row.

The elevator boarding place layout generation unit 103 calculates various kinds of parameters for the elevator boarding place according to the elevator specification information 101 which has been input, as described below. Specifically, the elevator boarding place layout generation unit 103 adopts, from among the various elevator specification information prepared in advance in the parameter database 107, elevator boarding place parameters, which are most similar to the elevator specification information 101 which has been input as described earlier, as various kinds of elevator boarding place parameters corresponding to the input elevator specification information 101.

Incidentally, the elevator boarding place layout generation unit 103 may perform regression analysis of the parameter database 120, find a regression formula based on the elevator specification information 101, and calculate parameters for the elevator boarding place, which are calculated according to the regression formula, as various kinds of elevator boarding place parameters according to the input elevator specification information 101.

Furthermore, the elevator boarding place layout generation unit 103 may be caused to learn the various kinds of the elevator boarding place parameters in advance with respect to the elevator specification information 101 by using a neural network and adopt various kinds of the elevator boarding place parameters, which are calculated from the input elevator specification information 101 by using the learned input network, as the various kinds of the elevator boarding place parameters according to the input elevator specification information 101.

(2) Operation Example of in-Building Traffic Prediction System

The in-building traffic prediction system 1 has the above-described configuration; and next, an elevator boarding place layout generation method will be explained as its operation example.

Figure 6:
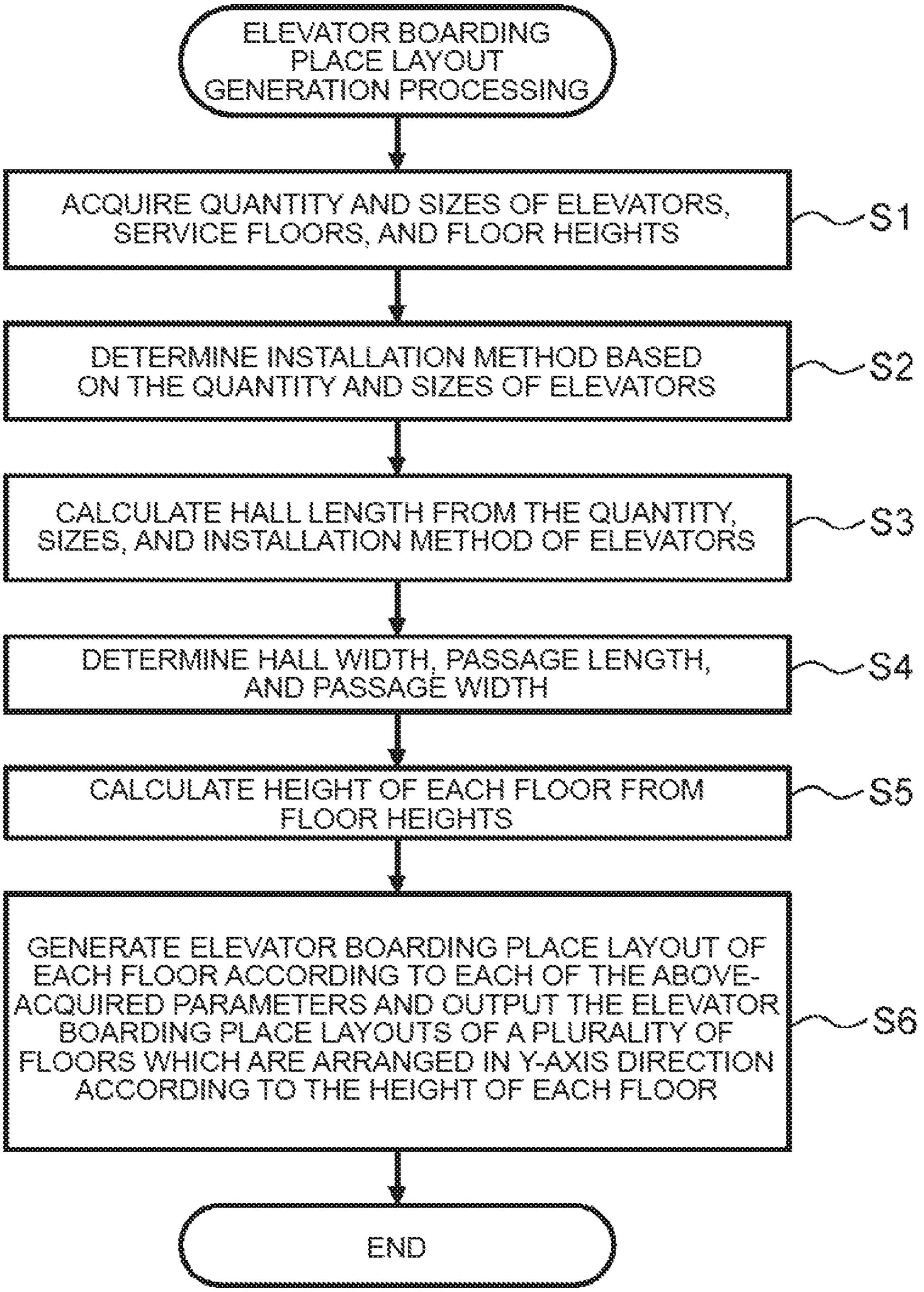
FIG. 6 is a diagram illustrating a flowchart for generating an elevator boarding place.

FIG. 6 is a flowchart illustrating an example of the elevator boarding place layout generation processing. The elevator boarding place layout generation unit 103 firstly acquires information about the quantity and sizes of elevators, service floors, and floor heights from the input elevator specification information 101 (step S1). This elevator specification information 101 merely has the information about the quantity and sizes of elevators, service floors, and floor heights as described above and the layout of the elevator boarding place cannot be generated directly from this information; however, the layout of the elevator boarding place is generated by using a method described below.

Specifically, the elevator boarding place layout generation unit 103 determines an installation method based on the thus-acquired quantity and sizes of the elevators (step S2). The installation method mentioned here indicates whether the plurality of elevators are placed in an opposed arrangement, a planar arrangement, or other arrangements as described later. Incidentally, the opposed arrangement is a form where the respective elevators are arranged opposite each other in an elevator hall (or hall); and the planar arrangement is a form where the respective elevators are aligned in one row, not opposite each other.

Next, the elevator boarding place layout generation unit 103 calculates the hall length of the elevator boarding place on the basis of the quantity and sizes of the elevators, which have been acquired from the elevator specification information 101 as described above, and the installation method determined as described above, while securing some margins as necessary and as described later (step S3). Incidentally, this hall length may be set, for example, as a preset value.

Then, the elevator boarding place layout generation unit 103 determines the hall width, passage length, and passage width with reference to the parameter database 120 (step S4).

Subsequently, the elevator boarding place layout generation unit 103 calculates the height from a reference floor to each floor on the basis of the floor heights acquired in step S1 (step S5). Since the floor height is a relative distance to a floor which is one floor above, or a service floor, the height of the reference floor can be obtained by calculating the total sum of the floor heights from the reference floor to a floor that is one floor below the floor regarding which the height needs to be found.

Next, the elevator boarding place layout generation unit 103 can generate the elevator boarding place layout of each floor by repeatedly executing the above-described steps S1 to S4, using as inputs the quantity and sizes of the elevators, the passage width, the passage length, the hall width, the hall length, and the arrangement method as the above-acquired parameters for each floor.

When the elevator boarding place layout generation unit 103 sets a direction where the respective elevators are arranged as an X-axis and also sets a hall width direction of the hall area as a Z-axis according to the height of each floor calculated in step S5, the elevator boarding place layout generation unit 103 places the thus-generated elevator boarding place layouts of the respective floors in a Y-axis direction which is a vertical direction of the respective floors (see FIG. 11 described later), thereby generating and outputting the elevator boarding place layouts of a plurality of floors (step S6).

Then, the elevator boarding place layout generation method according to this embodiment will be explained more specifically with reference to FIG. 7 to FIG. 9, FIG. 10, and FIG. 11.

This embodiment can be applied to a case where the elevator boarding place layouts of the plurality of floors are created; however, an explanation will be provided here, as an example, about a case where the elevator boarding place layout of one floor is created.

In this embodiment, the elevator boarding place layout of one floor is composed of at least the hall area, the passage area, and the elevators. An example of creation of the elevator boarding place layout will be explained below with reference to FIG. 7 to FIG. 9, while indicating some elevator arrangement examples.

Figure 7:
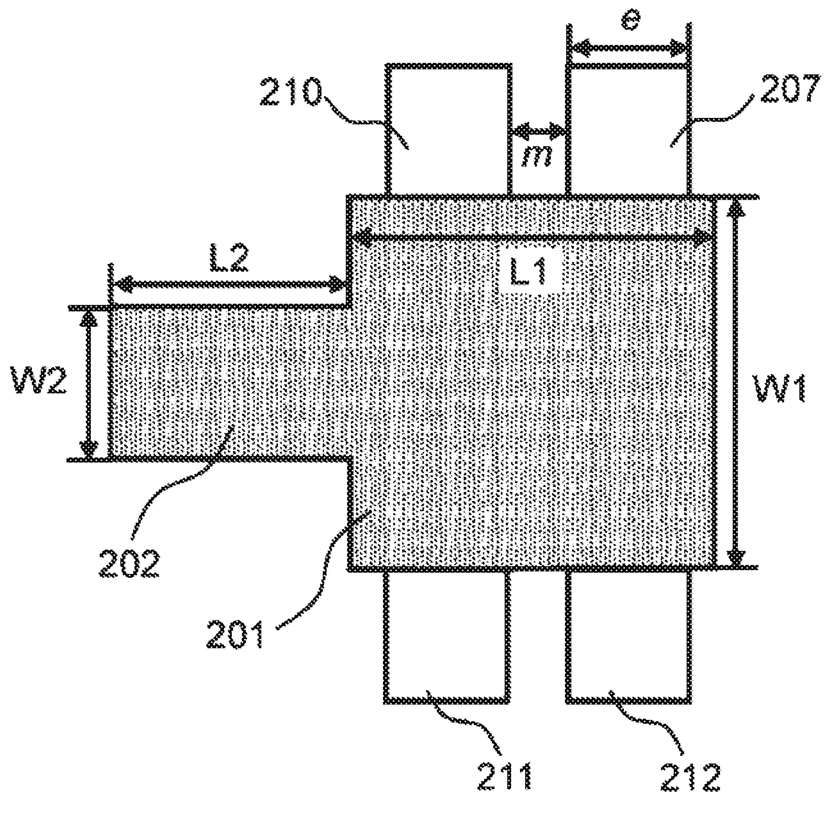
FIG. 7 is a diagram illustrating an example of an elevator boarding place layout of one floor in an opposed arrangement to be generated.

FIG. 7 is a diagram illustrating the elevator boarding place layout of only one floor in a case of the opposed arrangement where elevators 207, 210 and elevators 211, 212 are arranged in two rows opposite each other.

It is assumed that this elevator boarding place layout is composed of, as an example, a hall area 201, a passage area 202, and the elevators 207, 210, 211, 212. The shape of the hall area 201 is determined uniquely by a hall length L1 and a hall width W1, while the shape of the passage area 202 is determined uniquely by a passage length L2 and a passage width W2.

Firstly, the hall length L1 is determined as a value equal to or more than a value obtained by multiplying the elevator width size e by the installed quantity (two elevators in the example illustrated in the drawing) of each elevator row (the elevators 207, 210 or the elevators 211, 212 in the example illustrated in the drawing) on the basis of each width size e and the installed quantity (four elevators in the example illustrated in the drawing) of the elevators 207, 210, 211, 212 which can be acquired from the input elevator specification information 101. In other words, this hall length L1 is determined to be equal to or more than a value obtained by multiplying the quantity of a half of the total installed quantity of all the elevators 207, 210, 211, 212 (two elevators in the example illustrated in the drawing) by the elevator width size e.

Incidentally, in this embodiment, when determining the hall length L1 as described above, restrictions to be imposed when actually installing the elevators 207, 210, 211, 212 may also be considered and, besides each width size e of the elevators 207, 210, 211, 212 mentioned above, margin m required upon the installation between the elevator 207 and the elevator 210 or margin m required upon the installation between the elevator 211 and the elevator 212 may further be considered. Incidentally, in this embodiment, as an example for the sake of ease of explanation, the center of the passage area 202 in the direction of the hall width W1 is substantially aligned with the center of the hall area 201.

Figure 8:
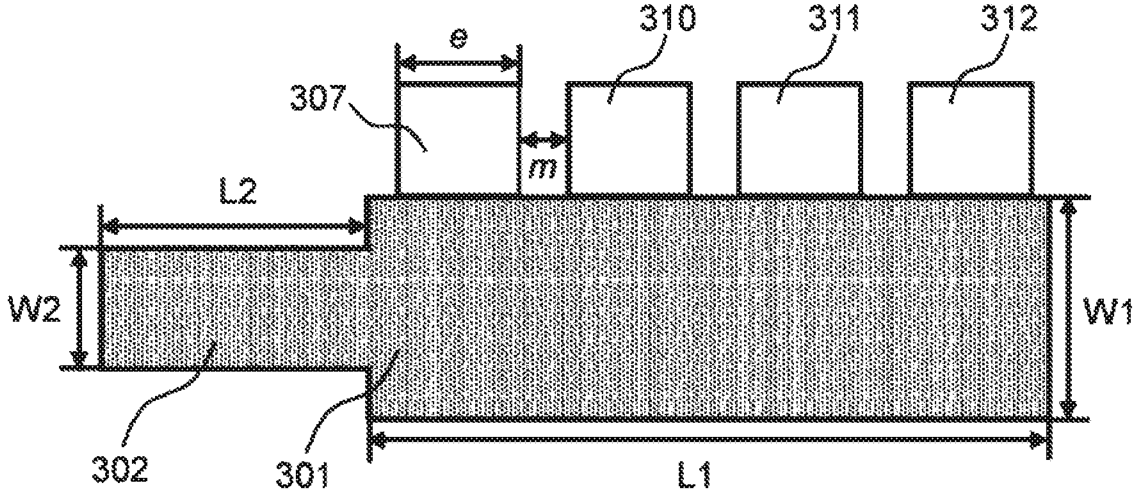
FIG. 8 is a diagram illustrating an example of a case where a passage is provided on the left side in an elevator boarding place layout of one floor in a planar arrangement to be generated.

FIG. 8 illustrates an elevator boarding place layout of only one floor in a case of the planar arrangement where a plurality of elevators 308, 310, 311, 312 are aligned in one row.

This elevator boarding place layout is also composed of, for example, a hall area 301, a passage area 302, and the elevators 307, 310, 311, 312 almost in the same manner as the one example described above.

The shape of the hall area 301 is determined uniquely by the hall length L1 and the hall width W1, while the shape of the passage area 302 is determined uniquely by the passage length L2 and the passage width W2.

Firstly, the hall length L1 is determined as a value equal to or more than a value obtained by multiplying the elevator width size e by the installed quantity (four elevators in the example illustrated in the drawing) of the elevator row (the row of the elevators 307, 310, 311, 312 in the example illustrated in the drawing) on the basis of each width size e and the installed quantity (four elevators in the example illustrated in the drawing) of the elevators 307, 310, 311, 312 which can be acquired from the input elevator specification information 101.

Incidentally, in this embodiment, when determining the hall length L1 as described above, restrictions to be imposed when actually installing the elevators 307, 310, 311, 312 may also be considered and, besides each width size e of the elevators 307, 310, 311, 312 mentioned above, margin m required upon the installation of each interval between the elevators 307, 310, 311, 312 may further be considered. Incidentally, in this embodiment, as an example for the sake of ease of explanation, the center of the passage area 302 in the direction of the hall width W1 is substantially aligned with the center of the hall area 301.

Figure 9:
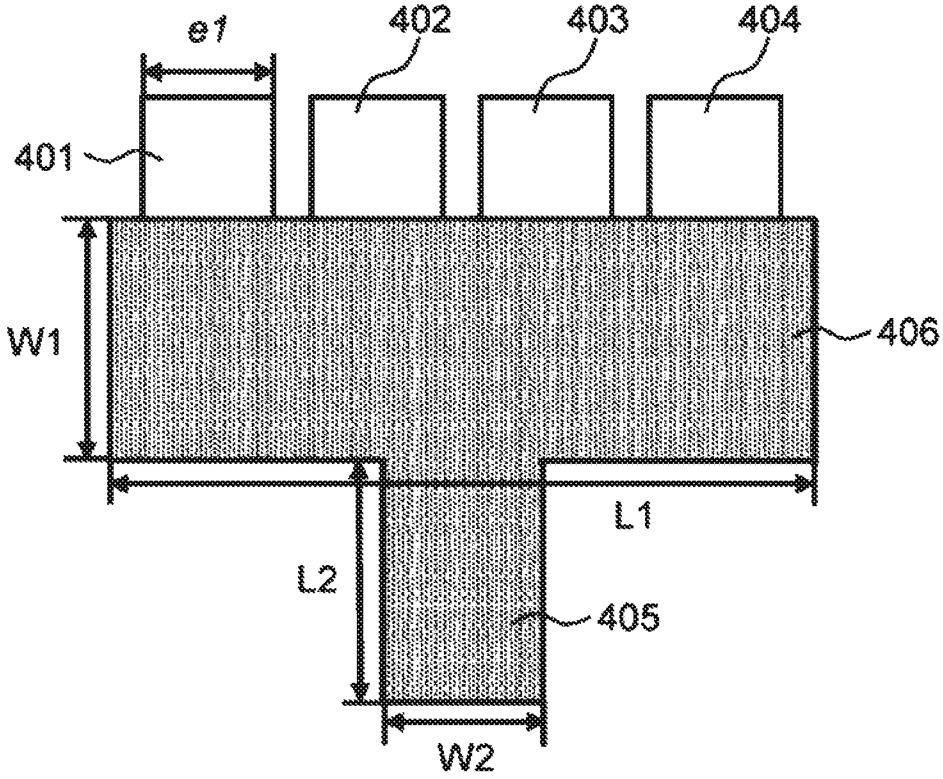
FIG. 9 is a diagram illustrating an example of a case where a passage is provided in front of elevators in an elevator boarding place layout of one floor in a planar arrangement to be generated.

FIG. 9 illustrates an elevator boarding place layout of only one floor in a case of the planar arrangement where the plurality of elevators 307, 310, 311, 312 are aligned in one row.

In FIG. 8 described above, the passage area 302 is located on the left side in a state facing the plurality of elevators 307, 310, 311, 312 in the hall area 301; and in FIG. 9, a passage area 405 is located on the rear side in a state facing a plurality of elevators 401, 402, 403, 404 in a hall area 406.

Therefore, the position and orientation of the passage area 405 in the elevator boarding place layout illustrated in the drawing are changed from those in the elevator boarding place layout illustrated in FIG. 8; however, the shape of the passage area 405 is determined uniquely by the passage length L2 and the passage width W2.

In this embodiment, attention is focused on the fact that the arrangement of, and the positional relationship between, each hall area, the passage area, and the elevators which configure the aforementioned various elevator boarding places, can be determined by the arrangement of the elevators such as the planar arrangement or the opposed arrangement and the passage arrangement method as described above; and, therefore, by determining the arrangement of the elevators and the positional relationship of the passage, the positional relationship between the passage area and the hall area in the elevator boarding place layout is determined. In this embodiment, the planar arrangement or the opposed arrangement of the elevators is determined based on at least either one of the quantity and sizes of the elevators.

Figure 10:
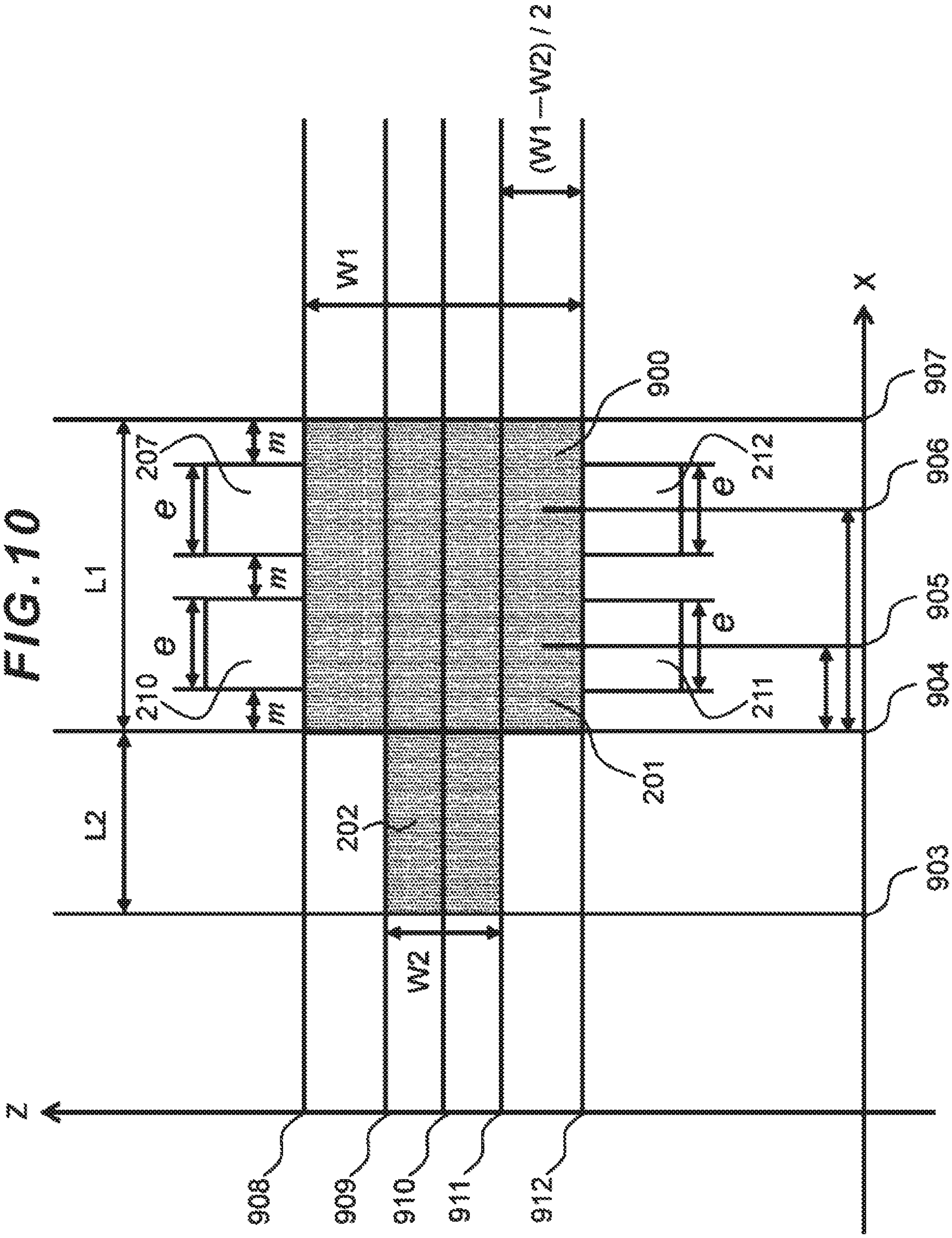
FIG. 10 is a diagram illustrating the relationship between positions and sizes which constitute elevator boarding place layouts by using an example of the elevator boarding place layouts.

FIG. 10 illustrates an example where the arrangement of the plurality of elevators 207, 210, 211, 212 in the elevator boarding place layout in the opposed arrangement illustrated in FIG. 7 is determined. In the example illustrated in the drawing, the horizontal direction illustrated in the drawing is the X-axis and the vertical direction is the Z-axis relative to the Y-axis corresponding to the height direction of the building as explained earlier.

In the example illustrated in FIG. 10, when edges 903, 904, 905, 906, 907 are determined in the X-axis direction and edges 908, 909, 910, 911, 912 are determined in the Z-axis direction, their shapes and the installed positions of the plurality of elevators 207, 210, 211, 212 are uniquely determined, thereby making it possible to generate an elevator boarding place layout 900.

Firstly, when a reference position 903 in the X-axis direction is set as a reference, it is checked if the respective edges 903, 904, 905, 906, 907 in the X-axis direction can be calculated by using the reference position 903 as the reference.

Firstly, the edge 904 can be calculated as the position moved by an amount equal to the passage length L2 from the reference position 903 in the X-axis direction. The center position 905 of the elevator installed position can be calculated as the position moved by an amount equal to the sum of the margin m and a half of the elevator size e/2 from the edge 904 in the X-axis direction.

The center position 906 can be calculated as the position moved by an amount equal to the sum of the margin m and the elevator size e from the center position 905 in the X-axis direction. The edge 907 can be determined by moving the position by an amount equal to the hall width L1 from the edge 904 in the X-axis direction.

This hall width L1 may be calculated as the sum of total sizes of the installed quantity of the elevators per row and (the installed quantity of the elevators per row+1)×margin m. Consequently, it has been successfully confirmed that all the edges 904, 905, 906, 907 in the X-axis direction can be determined.

On the other hand, when a reference position 912 in the Z-axis direction is set as a reference, it is checked if edges 908, 909, 910, 911, 912 can be calculated by using the reference position 912 as the reference.

Firstly, the edge 908 can be calculated as the position moved by an amount equal to the hall width w1 from the reference position 912 in the Z-axis direction. Assuming that the center of the passage area 202 is aligned with the center of the hall area 201 in the Z direction, the edge 910 can be calculated as the position moved by an amount equal to a half of the hall width W1/2 from the edge 912 in the Z-axis direction. Since the edge 910 is the center of the passage area 202, the edge 911 can be calculated as the position moved by an amount equal to a half of the passage width W2/2 from the edge 910 in a negative direction of the Z-axis and the edge 909 can be calculated as the position moved by an amount equal to a half of the passage width w2/2 from the edge 910 in the Y-axis direction.

Consequently, all the edges 909, 910, 911, 912 in the Z-axis direction can be determined, so that it has been successfully confirmed that the shape of the elevator boarding place layout 900 can be uniquely determined as illustrated in FIG. 10.

Meanwhile, in this embodiment, the planar arrangement or the opposed arrangement may be selected depending on a sum value of the width sizes e of the installed elevators on the basis of the parameter database 120 as an example of a method for determining the planar arrangement or the opposed arrangement as described above. Alternatively, whether the planar arrangement or the opposed arrangement may more often be selected more simply according to the installed quantity of the elevators.

Furthermore, since the arrangement of the passage area often varies depending on the relevant building property, it may be determined to follow a preset arrangement or a plurality of arrangements may be provided. In this case, the positions are set for the respective passage areas.

In this embodiment, the passage width, the passage length, and the hall width which have not been calculated from the input elevator specification information 101 may be determined by using the parameter database 120 as explained so far.

Mainly the case where the elevator boarding place layout data of one floor is created has been explained above; and next, an explanation will be provided about a case where elevator boarding place layouts of a plurality of floors are created.

In most cases, an elevator moves in the vertical direction (corresponding to the aforementioned Y-direction) between the plurality of floors, so that elevator boarding places are installed on the plurality of floors. Since the elevator generally does not stop at all the floors in the building, but stops only at preset service floors (stop floors), the elevator boarding places are often installed only on the service floors.

Accordingly, this embodiment is designed to construct the elevator boarding place layouts of the plurality of floors by repeatedly arranging the aforementioned elevator boarding place layout of one floor to be placed one over another in the vertical direction by using the information about the service floors and the floor heights included in the elevator specification information 101.

Figure 11:
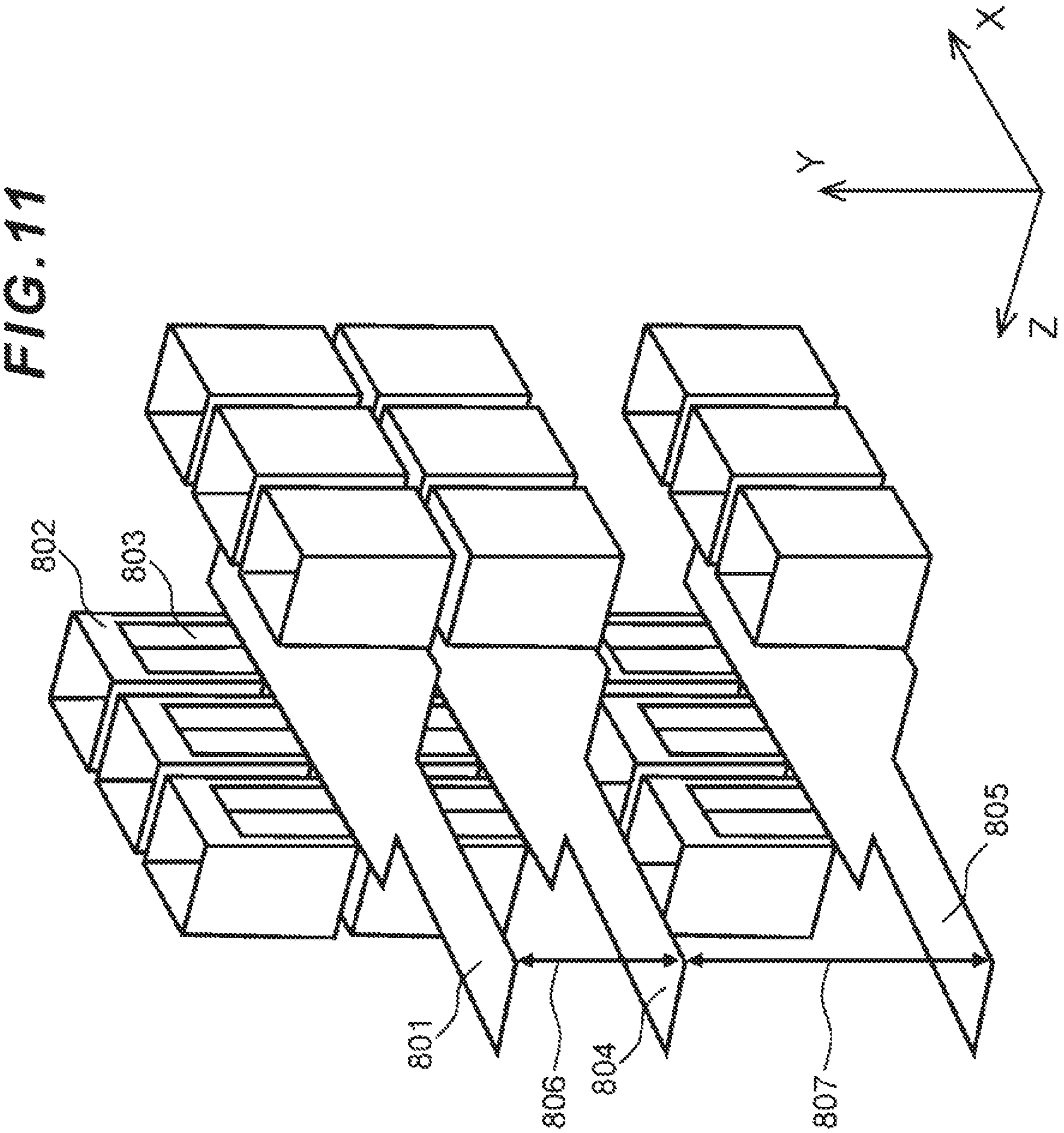
FIG. 11 is a diagram illustrating information which constitutes the elevator boarding place layouts by using an example of a 3D display result of the elevator boarding place layouts.

FIG. 11 illustrates a 3-D display example of the elevator boarding place layouts including the plurality of floors. A hoistway 802 indicates a hoistway installed at the elevator boarding place on an elevator floor 801. A door 803 indicates an elevator door which is installed for passengers to get into the elevator of the hoistway 802.

Besides the floor 801, elevator boarding places are also constructed on a floor 804 below the floor 801 and on a floor

805 further below it. Incidentally, an inter-floor size between the base floor 805 and the floor 804 and the height-direction position of each floor are determined according to the floor height or the height.

However, regarding denotative heights and floor heights, the inter-floor size between the floor 804 and the floor 801 may be an arbitrary value independent of the floor height. This is because better visibility in a denotative sense is often achieved by setting a larger value to the inter-floor size rather than setting the inter-floor size according to the floor height obtained from the elevator specification information 101. Incidentally, this may be generated with an arbitrary value which is different from the specifications of the elevators.

It is assumed here that all the elevator boarding places of the respective floors have the same shape; however, regarding floors on which the quantity of elevators to operate is different, it may be designed in a form where the shape of the elevator boarding place is changed for each floor. However, it is necessary to locate the positions of the respective elevators so that they are not misaligned between the floors.

(3) Regression Analysis Based on Scatter Diagram of Parameter Database

Figure 12:
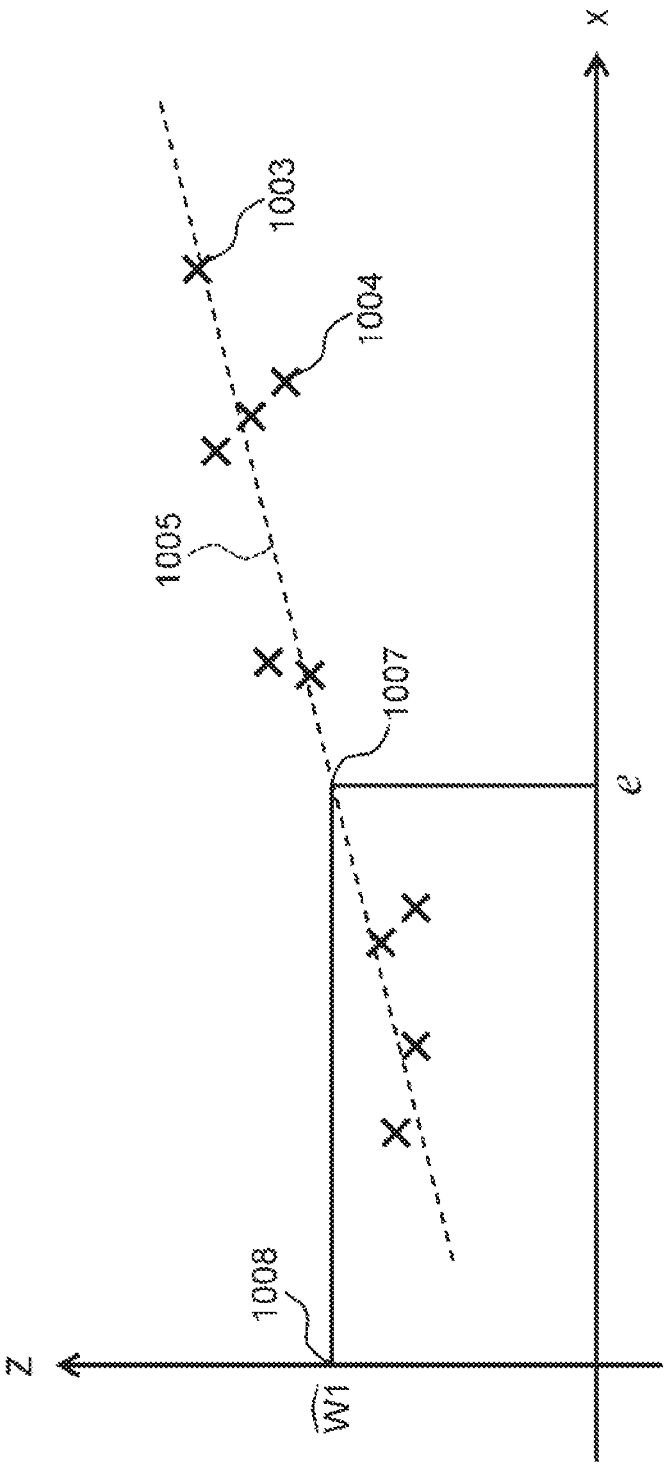
FIG. 12 is a scatter diagram illustrating an example of expressing the content of the parameter database with two axes.

FIG. 12 is a scatter diagram illustrating an example where the content of the parameter database 120 is expressed with two axes. An explanation will be provided here about a method using regression analysis with the intention to identify one type of parameter to be determined when inputting at least one other parameter by using the parameter database 120.

The X-axis indicated in the drawing is an axis indicating the parameter which is the input; and the Z-axis is an axis indicating the parameter which is the output. Corresponding values 1003, 1004 indicate the results of taking out the parameter which should be the input and the parameter which should be the output, from the parameters managed in the parameter database 120 and plotting them as the scatter diagram.

In this embodiment, a regression formula capable of explaining the output parameter via a function of the input parameter is calculated from these plotted input parameter and output parameter. This drawing indicates, for example, a special property 1005 according to an example of a linear regression formula. This linear regression formula is obtained so as to make the distance to the plotted input and output points on the scatter diagram as close as possible and can be calculated by, for example, the least squares method. An output value for an input value can be calculated by using this linear regression formula and assigning the input value to the regression formula. You can see from the example illustrated in the drawing that the output W1 indicated on the Z-axis can be found via a point 1007 on the regression formula with respect to the input e on the X-axis.

(4) Advantageous Effects of This Embodiment

According to the above-described configuration, the elevator boarding place layout of each floor can be generated automatically, with no manual intervention, from the elevator specifications including the quantity, sizes, and service floors of the elevators which can be generally easily available. As a result, necessary data can be easily created to carry out the simulations of human transportation by the elevators.

(5) Other Embodiments

The above-described embodiments are examples given for the purpose of describing this invention, and it is not intended to limit the invention only to these embodiments. Accordingly, this invention can be utilized in various ways unless the utilizations depart from the gist of the invention. For example, processing sequences of various programs have been explained sequentially in the embodiments described above; however, the order of the processing sequences is not particularly limited to that described above. Therefore, unless any conflicting processing result is obtained, the order of processing may be rearranged or concurrent operations may be performed. Furthermore, the programs including each processing block in the above-described embodiments may be in a form where, for example, the programs are stored in a computer-readable, non-transitory storage medium.

INDUSTRIAL APPLICABILITY

The present invention can be applied to a wide variety of in-building traffic prediction systems and elevator boarding place layout generation methods and programs for the in-building traffic prediction systems with regard to the technology for generating the layouts of the elevator boarding places.

REFERENCE SIGNS LIST

1: in-building traffic prediction system
101: elevator specification information
102: in-building pedestrian movement data
103: elevator boarding place layout generation unit
104: elevator boarding place layout data
105: in-building human flow simulation unit
106: simulation result information

The invention claimed is:

1. An in-building traffic prediction system comprising:

an elevator boarding place layout generation unit that: by using, as input, elevator specification information including sizes of a plurality of elevators, a quantity of the plurality of elevators, and service floors of the plurality of elevators, determines a method for installing the plurality of elevators based on either the quantity of the plurality of elevators or the sizes of the plurality of elevators from arrangements including at least one or more of a planar arrangement where the plurality of elevators are aligned in a row on one side configuring a boarding place of the elevator, or an opposed arrangement where the elevators are divided and located on two opposite sides configuring the elevator boarding place; determines a shape of the elevator boarding place by determining the two opposite sides configuring the elevator boarding place on the basis of the installation method and the sizes and quantity of the plurality of elevators; and further generates an elevator boarding place layout by determining each floor where the elevator boarding place is to be installed according to the service floors; and a simulation unit that predicts operations of the plurality of elevators and movements of pedestrians in an entire building or at an arbitrary point on the basis of at least the elevator boarding place layout.

2. The in-building traffic prediction system according to claim 1, wherein by using, as input, the elevator specification information including the sizes of the plurality of elevators, capacities of the plurality of elevators, and the quantity of the plurality of elevators, the elevator boarding place layout generation unit automatically calculates the sizes which uniquely determine the elevator boarding place layout.

3. The in-building traffic prediction system according to claim 1, wherein the sizes of the elevators are determined based on their capacities.

4. The in-building traffic prediction system according to claim 1, wherein the elevator boarding place layout generation unit generates, as the elevator boarding place layout to be output, information including at least a planar-direction shape of the elevator boarding place layout of each floor where the elevator boarding place is provided, and positions of the plurality of elevators, and a position of a passage area in the elevator boarding place.

5. An elevator boarding place layout generation method for an in-building traffic prediction system, comprising:

an elevator boarding place layout generation step of causing the in-building traffic prediction system to: by using, as input, elevator specification information including sizes of a plurality of elevators, a quantity of the plurality of elevators, and service floors of the plurality of elevators, determine a method for installing the plurality of elevators based on either the quantity of the plurality of elevators or the sizes of the plurality of elevators from arrangements including at least one or more of a planar arrangement where the plurality of elevators are aligned in a row on one side configuring a boarding place of the elevator, or an opposed arrangement where the elevators are divided and located on two opposite sides configuring the elevator boarding place; determine a shape of the elevator boarding place by determining the two opposite sides configuring the elevator boarding place on the basis of the installation method and the sizes and quantity of the plurality of elevators; and further generate an elevator boarding place layout by determining each floor where the elevator boarding place is to be installed according to the service floors; and a simulation step of causing the in-building traffic prediction system to predict operations of the plurality of elevators and movements of pedestrians in an entire building or at an arbitrary point on the basis of at least the elevator boarding place layout.

6. A non-transitory computer-readable recording medium for storing an elevator boarding place layout generation program for an in-building traffic prediction system, the elevator boarding place layout generation program designed to cause the in-building traffic prediction system to: by using, as input, elevator specification information including sizes of a plurality of elevators, a quantity of the plurality of elevators, and service floors of the plurality of elevators, determine a method for installing the plurality of elevators based on either the quantity of the plurality of elevators or the sizes of the plurality of elevators from arrangements including at least one or more of a planar arrangement where the plurality of elevators are aligned in a row on one side configuring a boarding place of the elevator, or an opposed arrangement where the elevators are divided and located on two opposite sides configuring the elevator boarding place; determine a shape of the elevator boarding place by determining the two opposite sides configuring the elevator boarding place on the basis of the installation method and the sizes and quantity of the plurality of elevators; and further generate an elevator boarding place layout by determining each floor where the elevator boarding place is to be installed according to the service floors, thereby causing the in-building traffic prediction system to predict operations of the plurality of elevators and movements of pedestrians in an entire building or at an arbitrary point on the basis of at least the elevator boarding place layout.

* * * * *